Oct. 14, 1941.                  A. PAHL                    2,259,321
                             LIGHTING DEVICE
                           Filed June 22, 1939

WITNESSES:
E. A. McCloskey
Nw. C. Groome

INVENTOR
Arno Pahl.
BY G. M. Crawford
ATTORNEY

Patented Oct. 14, 1941

2,259,321

UNITED STATES PATENT OFFICE 2,259,321

LIGHTING DEVICE

Arno Pahl, Berlin-Siemensstadt, Germany, assignor to Westinghouse Electric & Manufacturing Company, East Pittsburgh, Pa., a corporation of Pennsylvania Application June 22, 1939, Serial No. 280,476
In Germany June 24, 1938

6 Claims. (Cl. 240—25)

The invention relates, generally, to lighting devices, and, more particularly, to reflectors for producing band-shaped broad radiation which is applicable in a multiplicity of situations and, in particular, for mixed light illumination.

The attainment of a band-shaped light distribution by using a suitably formed oval reflector or mirror or again by correspondingly arranged mirror cross-sections, is known. In mirror illuminating units which were provided for holding two light sources, it was necessary to use two or two pair of such mirrors or reflectors.

The object of my invention, generally stated, is to provide a reflector of simple and economical construction which is suitable for street and roadway lighting purposes.

A more specific object of my invention is to provide a reflector which shall function to reflect the light produced by one or more light sources disposed therein in the form of a broad beam.

Another object of my invention is to provide a reflector for producing a band-shaped radiation which functions to provide substantially the same light distribution when used with a single light source or with a plurality of light sources.

A further object of my invention is to provide a reflector for producing a band-shaped radiation which when used with a plurality of light sources of different kinds functions to superimpose the rays from the different light sources uniformly on each other.

Another object of my invention is to provide a lighting unit which shall function to produce substantially the same light distribution when one light source is used or a plurality of light sources are used.

Still another object of my invention is to provide a lighting unit in which a plurality of light sources of different nature may be used and which shall function to produce a good mixture of the light from the several different sources.

In accordance with the invention, each mirror or reflector half in a mirror reflector for band-shaped broad radiation with one or more light sources in which two curved reflecting surfaces are located opposite to each other consists of two surfaces of rotation which are bent with reference to each other in such manner that two light sources on a symmetrical axis at a distance from a reference point which is equal to the distance of the two focal points, which will be referred to hereinafter as the lamp points, yield approximately the same light distribution as a single light source arranged at the center or zero point of the reflector, which is a point on the symmetric or longitudinal axis thereof opposite the juncture of the two bent surfaces.

For a better understanding of the nature and objects of the invention reference may be had to the following detailed description considered in conjunction with the drawing, in which.

Figure 1:
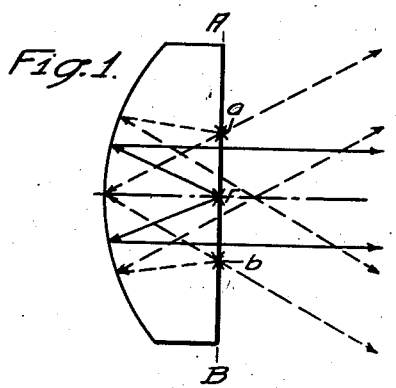
Figure 1 is a cross-sectional view of a reflector which has a parabolic form in the sectional plane.
Figure 2:
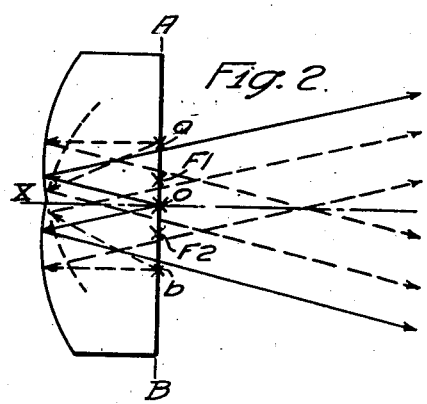
Fig. 2 is a cross-sectional view of a reflector embodying the principal features of the invention.

The principle of the reflector is manifest from Figs. 1 and 2. In Fig. 1, a section through a reflector, which in the sectional plane has a parabolic form, is illustrated. If, at the focal point F of this reflector an approximately point light source is disposed, the light will radiate parallel in the direction of the reflector axis as the indicated ray path shows. If, on the other hand, two light sources are arranged on the axis A—B, which is the axis of symmetry of the reflector, and at the same distance from the focal point F as at the points $a$ and $b$, there results a divergent light distribution, as can be seen from the radiation path shown in dash lines. If the reflector is bent as is illustrated in Fig. 2 on the center axis X—0, there result two focal points F1 and F2. The rays of the light source at the zero point 0 of the reflector, which corresponds to the point F in Fig. 1, diverge. The bundle of rays from the two light sources arranged at the points $a$ and $b$ converge with increasing bending. There results accordingly a definite bending at which the divergence of the bundle of rays of the light source at 0 and the divergence of the light rays from $a$ and $b$ are equal. This position is shown in Fig. 2.

The position of the two reflector parts indicated in Fig. 2 is particularly propitious if a plurality of light sources are to be used. If, for example, a metal vapor lamp is disposed at the center or zero point 0 and hot filament lamps are disposed at the two points $a$ and $b$, a good light mixture is attained.

Figure 3:
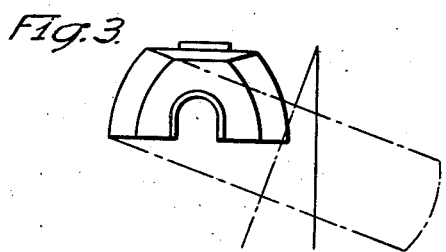
Fig. 3 is an end view in elevation of the reflector of Fig. 2.
Figure 4:
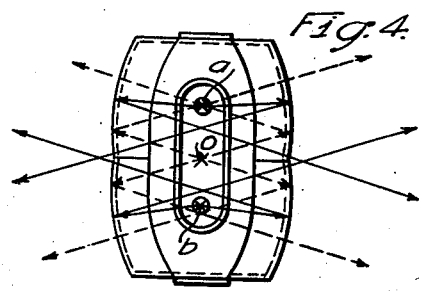
Fig. 4 is a plan view of the reflector of Figs. 2 and 3 showing the path of the light rays produced by the use of a plurality of light sources.

Fig. 3 shows an end view in elevation of a mirror in accordance with the invention. In Fig. 4, which is a plan view of the mirror, the path of the rays of such a mirror is illustrated and here at the center at 0, a metal vapor lamp is disposed and at the points $a$ and $b$ a filament lamp. As will be apparent from the figure, the rays of the metal vapor lamp and the filament lamp are superimposed uniformly on each other.

Figure 5:
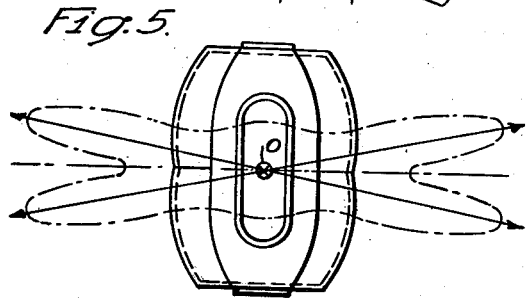
Fig. 5 is a plan view of the reflector of Figs. 2 and 3 showing the light distribution produced by a single light source.
Figure 6:
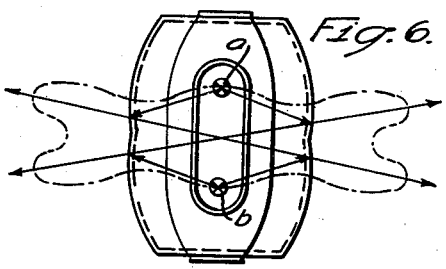
Fig. 6 is a plan view of the reflector of Figs. 2 and 3 showing the light distribution produced by two light sources.

In Figs. 5 and 6, which are plan views of the mirror, light distribution curves of a mirror reflector in accordance with the invention are illustrated. Fig. 5 shows the light distribution using a single light source at the point 0 and Fig. 6 shows the light distribution using two light sources arranged at the points $a$ and $b$. Using three lamps, a light distribution which is composed of the super-position of the two light distributions will result.

Figure 7:
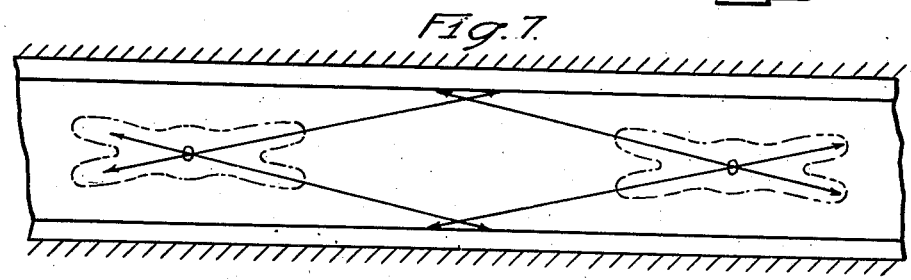
Fig. 7 is a plan view showing how the reflector of my invention may be utilized for street illumination.

Fig. 7 shows the significance of the mirror reflector in accordance with the invention for street illumination. It will be apparent from this figure that the center of the street which plays an unimportant part as far as traffic is concerned, receives smaller light intensity than the two sides of the street on which there is considerable traffic.

Figure 8:
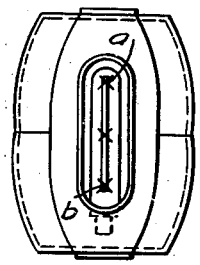
Fig. 8 is a plan view of the reflector of Figs. 2 and 3, showing the use therewith of an extended or elongated light source.

In Fig. 8, which is a plan view, a mirror reflector is illustrated in which an extended light source, for example, a metal vapor lamp, is arranged on the symmetric axis. To attain a good light distribution curve, the light source should preferably extend from the point $a$ to the point $b$.

If the illuminating device or reflector is not arranged at the center of the street but on both sides of the track, it may be desirable, in many cases, to illuminate the track itself with a metal vapor lamp and the pavement with a hot filament lamp. In this case, a hot filament lamp may be arranged at point $a$ and a metal vapor lamp at point $b$.

If a unilateral light distribution is desirable, it is sufficient to mount a light source either at the point $a$ or at the point $b$.

In view of the foregoing it will be apparent that I have provided a reflector for a lighting or illuminating unit which is so constructed that it will produce a broad light beam and will also produce substantially the same light distribution when used with a single light source mounted at the zero point thereof as when used with two light sources mounted on opposite sides of the zero point; that shall function to produce a good mixture of light from light sources of different nature when used therewith; which may be used with an extended or elongated light source, such, for example, as a metal vapor lamp and which may be used with only one light source disposed on either side of its zero point to produce a unilateral light distribution.

It is to be understood that the various light sources illustrated diagrammatically in the several figures may be mounted within the reflector in any suitable manner.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A reflector for producing band-shaped broad radiation with one or more light sources comprising, two oppositely disposed curved reflecting surfaces each of which is in the form of two adjacent surfaces of rotation having focal points on the axis of symmetry of the reflector and which are so bent with reference to each other that two light sources positioned on the axis of symmetry of the reflector on opposite sides of the zero point thereof at a distance equal to the distance between the said two focal points of the adjacent surfaces will produce substantially the same light distribution as a single light source located at the zero point of the reflector.

2. In combination, a reflector having oppositely disposed curved reflecting surfaces each of which consists of two surfaces of rotation having focal points on the axis of symmetry of the reflector on opposite sides of the zero point thereof, a hot filament lamp mounted at a point on the axis of symmetry on one side of the zero point at a distance therefrom equal to the distance between the two focal points and a metal vapor lamp mounted in a similar position on the opposite side of the zero point.

3. A reflector for use in a lighting unit for producing band-shaped radiation comprising two curved reflecting surfaces each of which is formed of two surfaces of rotation having focal points on the symmetrical axis of the reflector and so curved with respect to each other that the reflector will produce substantially the same light distribution when used with a single lamp source positioned at the zero point of the reflector as when used with a pair of light sources positioned on the symmetrical axis of the reflector on opposite sides of the zero point each at a distance from the zero point which has a predetermined relation to the distance between the focal points of the surfaces of rotation.

4. In combination, a reflector having oppositely disposed curved reflecting surfaces each of which consists of two surfaces of rotation and having a zero point and two focal points on opposite sides thereof on the axis of symmetry of the reflector, a metal vapor lamp mounted at the zero point, and hot filament lamps mounted on opposite sides of the zero point at a distance therefrom equal to the distance between the two focal points.

5. In combination, a reflector having oppositely disposed curved reflecting surfaces each of which consists of two surfaces of rotation and having a zero point and two focal points on opposite sides thereof on the axis of symmetry of the reflector, and an elongated lamp mounted on the said axis of symmetry of the reflector and extending between two points on opposite sides of the zero point equal to twice the distance between the said two focal points.

6. A lighting fixture for illuminating the surface of a roadway comprising a reflector having oppositely disposed curved reflecting surfaces, each of said opposite surfaces consisting of two surfaces of rotation and having a zero point on the axis of symmetry of the reflector, and a light source mounted on opposite sides of the zero point a predetermined distance from the focal points of the two surfaces of rotation along the axis of symmetry of the reflector whereby a band-shaped broad radiation of light is produced.

ARNO PAHL.